United States Patent [19]
Spence

[11] 3,928,847
[45] Dec. 23, 1975

[54] FAST SCAN ELECTRONIC CIRCUIT WITH CONTACT BOUNCE ELIMINATION FOR AN AUTOMATIC TYPING SYSTEM KEYBOARD

[75] Inventor: Gary W. Spence, Loretto, Minn.

[73] Assignee: CPT Corporation, Hopkins, Minn.

[22] Filed: Feb. 4, 1974

[21] Appl. No.: 439,310

[52] U.S. Cl. .............................. 340/365 E; 328/48
[51] Int. Cl.$^2$ .............................. G08C 1/00
[58] Field of Search .............................. 340/365 E

[56] References Cited

UNITED STATES PATENTS

| | | | |
|---|---|---|---|
| 3,448,254 | 6/1969 | Verhoeff | 340/365 E |
| 3,786,497 | 1/1974 | Davis | 340/365 E |
| 3,792,466 | 2/1974 | Arnold | 340/365 E |

OTHER PUBLICATIONS

Fairchild, "If You Want Better Designs, Use Fewer Components," EEE, May 1969, pp. 24, 25.

*Primary Examiner*—Thomas B. Habecker
*Attorney, Agent, or Firm*—Dorsey, Marquart, Windhorst, West and Halladay

[57] ABSTRACT

The present invention relates to a keyboard for a typing system. The keys are connected to a sixteen by eight matrix. The input to the matrix is provided by a one of sixteen decoder and the output by a one of eight multiplexer. The specific positions of the decoder and multiplexer are determined by a character counter which generates the keyboard code and ultimately a keyboard strobe to print the character designed by the keyboard code. As the keyboard strobe is generated a data bit corresponding to that keyboard code location is entered in parallel in four memory units to create an inhibit for the keyboard strobe so that continued depression of the key without release does not cause a multiple character print-out by the print mechanism. After the key has been released each memory location is then serially cleared with a reset timer to assure that contact bounce or the like does not prematurely clear the memory and enable an additional keyboard strobe.

8 Claims, 6 Drawing Figures

FAST SCAN ELECTRONIC CIRCUIT WITH CONTACT BOUNCE ELIMINATION FOR AN AUTOMATIC TYPING SYSTEM KEYBOARD

BACKGROUND OF THE INVENTION

This invention is directed primarily to the problem of contact bounce caused by depression of typewriter keys as it affects a keyboard with N key roll-over capacity.

Initially keyboards utilized a scanning circuit or counter which individually interrogated each position of a typewriter keyboard to determine whether or not a key was closed. When a closed key was located, the scanning circuit or counter would stop and that character would be printed upon releasing the key. The counter or scanning circuit would then begin interrogating each position again. If the operator of the system depressed a second key without releasing the first key there would be no output until the first key was released since this type of keyboard sequentially checked key contact closures. This is referred to as two key roll-over.

To solve the two key roll-over problem, a second generation electronic keyboard was developed which utilized a memory. Upon closure of a keyboard switch, a data bit was stored in the memory at a location which corresponded to that position of the scanner. The counter continued to sequentially scan the keys without stopping and if the same key was still depressed on the next scan it would not be reprinted. The bit would remain in the memory location until the key was released which would reset the bit in the memory. Until the memory was cleared the keyboard strobe for that key would be inhibited. The problem that occurs with second generation keyboards is that if a first and second key are depressed and the scanner is at an intermediate position between the first and the second alphanumeric positions, the characters are transposed. That is, the second character is printed and then the first instead of the the first and then the second (e.g., hte for the). A secondary problem is contact bounce. If the speed of the scanner is increased to decrease the scanning time and thus reduce the probability of transposing two characters, the effect of contact bounce increases and can result in an apparent open key to the scanner which then clears the memory and allows the character to be reprinted. Alternatively, if the speed of the scanner is reduced to eliminate the effect of contact bounce, then there is a higher probability that the scanner will be initially interposed between the two characters and consequently transposition of the characters continues to occur.

SUMMARY OF THE INVENTION

The design of this invention is intended to solve the problem of contact bounce in a keyboard with N-key roll-over capacity. It utilizes multiple memories with a reset timer to permit very fast scan times. A practical application of this concept uses four memories in parallel and a scan time of approximately 128 microseconds. As soon as a key is closed, a bit is entered in parallel in each of the multiple memories. When the key opens, while scanning, the memories are cleared serially after suitable time delays as determined by the reset timer. If a contact bounces, one of the memories may be cleared, but since the memory is cleared serially, the next scan will still indicate that it was the last printed character. The total timing interval to clear all memories is preferable chosen to be greater than the time a contact would normally bounce but less than the average physical reaction time of an operator of the keyboard. A suitable timing interval has been found to be between 12 to 16 milliseconds, clearing one of the four memories every 4 milliseconds.

DESCRIPTION OF THE PREFERRED EMBODIMENT

Figures 1, 2:
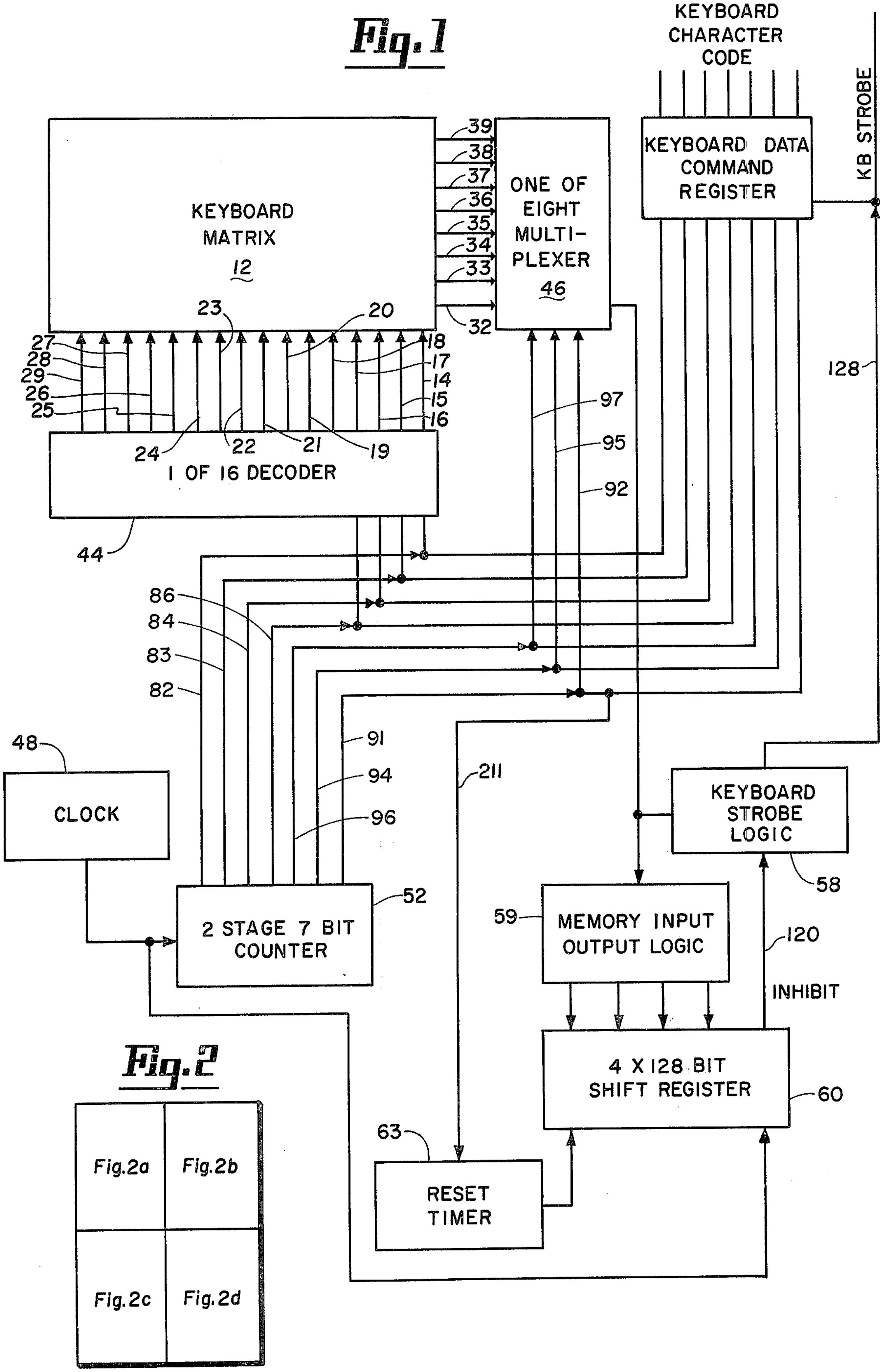
FIG. 1 is a block diagram showing the basic elements of my invention.
FIG. 2 consisting of FIGS. 2a through 2d, is a schematic diagram showing circuit details of the elements of FIG. 1 which may be utilized to practice my invention.
Figure 2A:
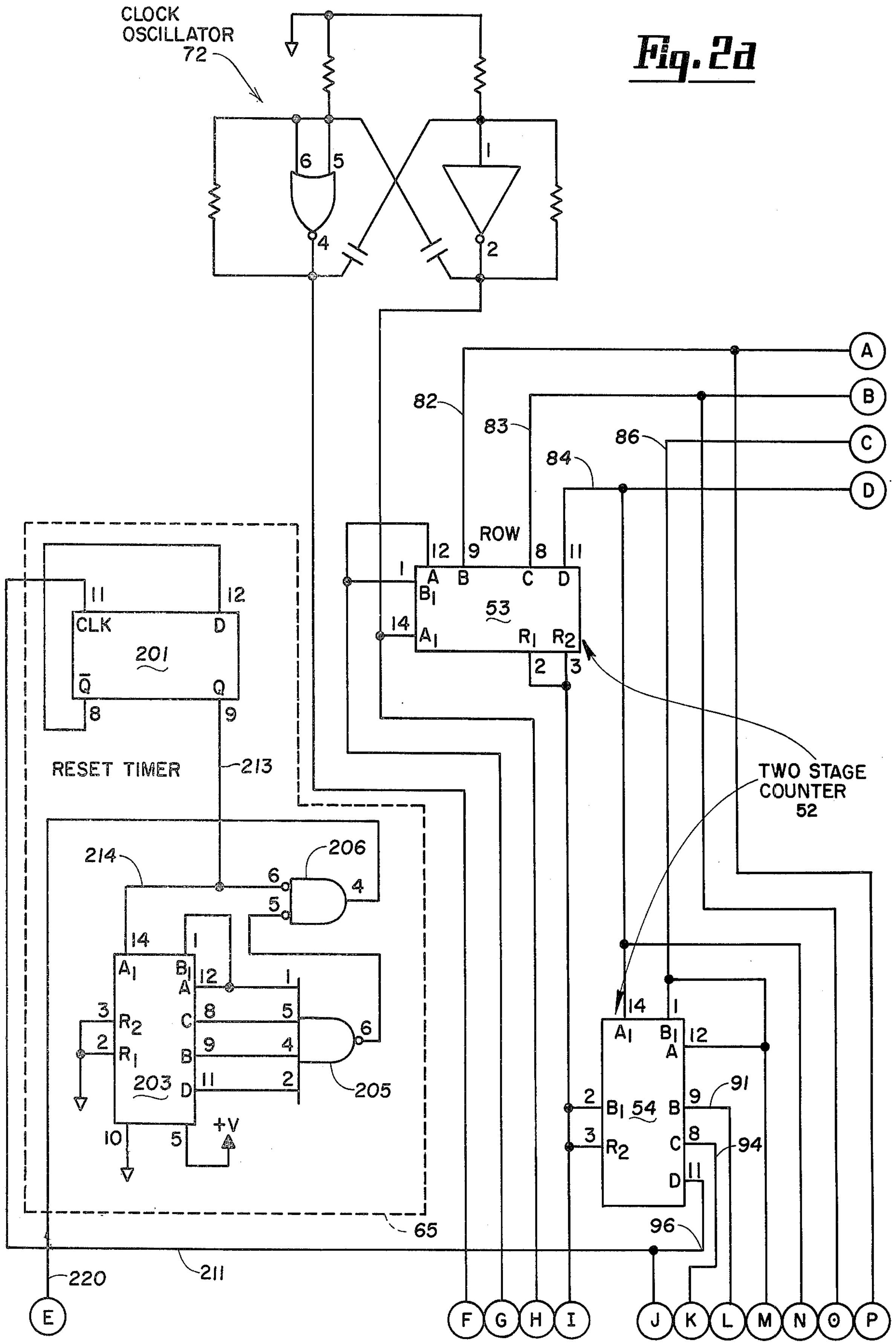
Figure 2B:
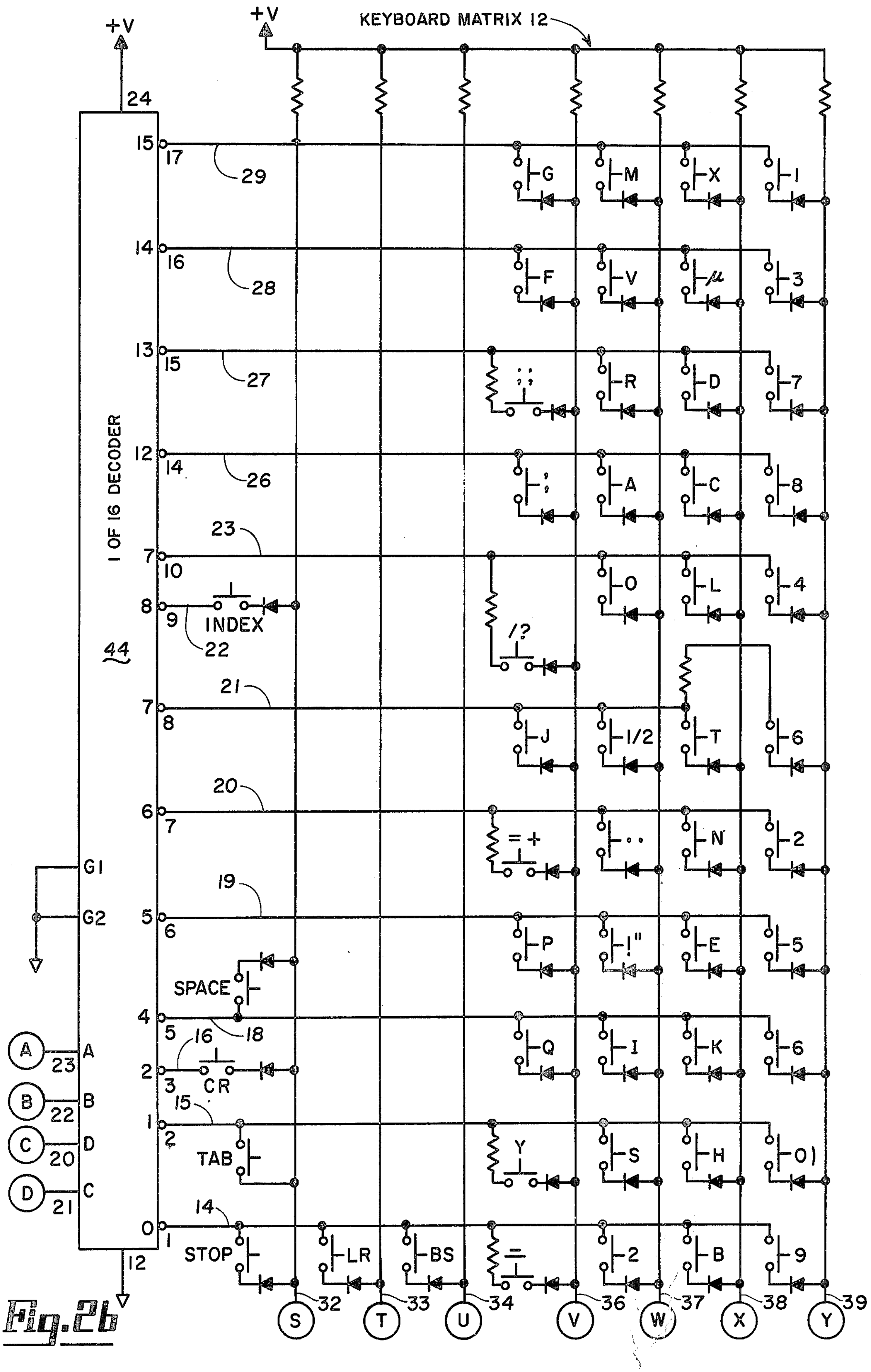
Figure 2C:
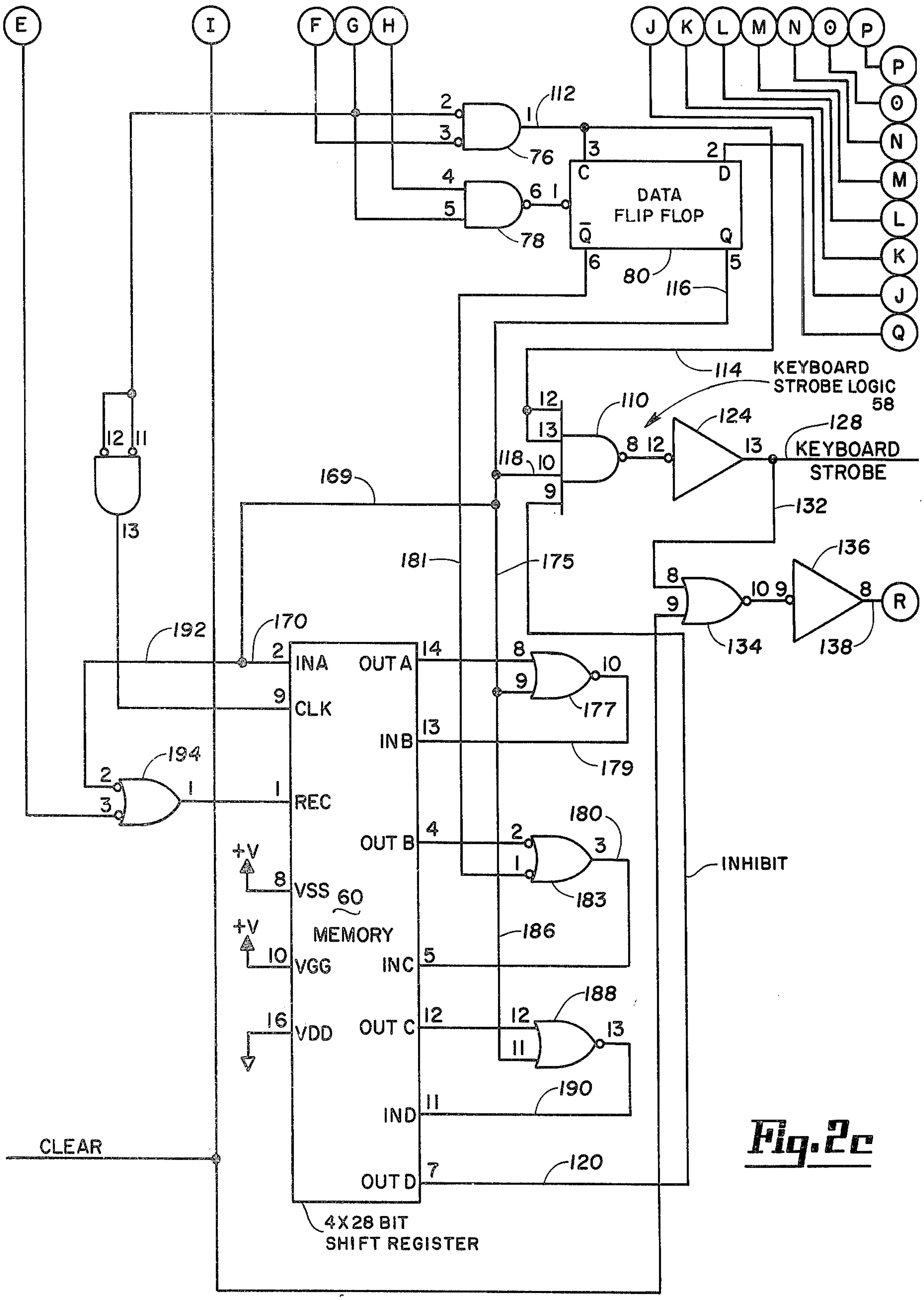
Figure 2D:
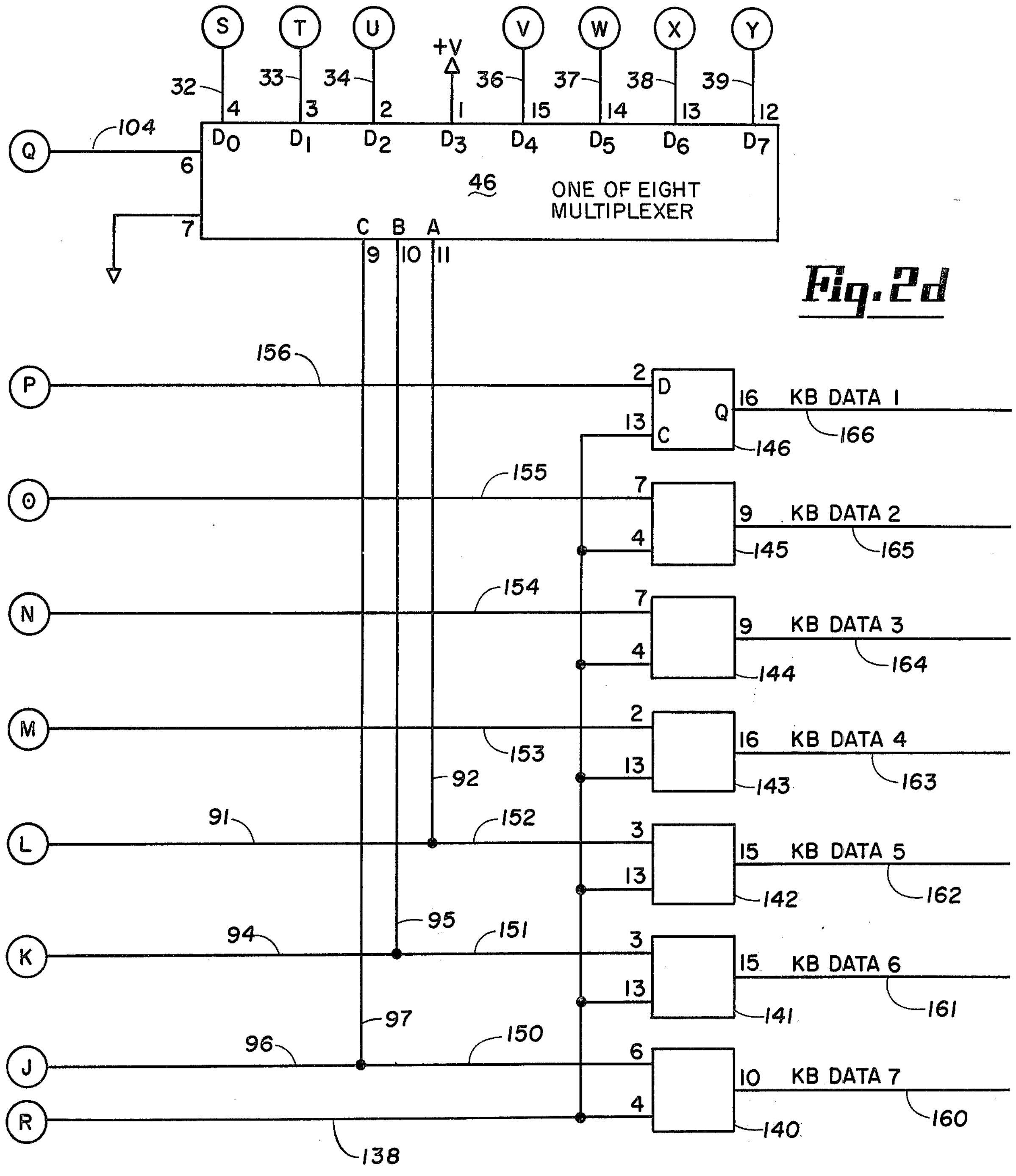

FIG. 1 shows in block diagram form the basic elements of my invention

Keyboard continuity switches interconnect conducting elements which form a coded matrix 12 having sixteen input lines 14–29 and eight output lines 32–39. The input lines 14–29 are driven by a one of 16 decoder 44 and the eight output lines 32–39 are scanned by a one of eight multiplexer 46.

A two megacycle free running oscillator is utilized as a two phase clock 48 to operate a seven position character counter 52 which establishes, in binary form, 128 combinations of the keyboard matrix 12. The four lowest order binary bits of the character counter are utilized to drive the one of sixteen decoder 44. The three most significant bits of the seven position counter 52 are utilized to drive the one of eight multiplexer 46. Since continuity switches are connected across the rows and columns of the keyboard matrix 12 with the switches connected to the alphanumeric character keys on the keyboard, when a key is depressed it will produce an output pulse from the one of eight multiplexer 46 at the precise count of the counter 52 which corresponds to the keyboard code of that row and that column.

This output is utilized with keyboard strobe logic 58 to produce a keyboard strobe pulse to the print mechanism to print the alphanumeric character in accordance with the keyboard date command. The code for the keyboard data command is generated by the character counter 52 indicating the precise count and thus location at which the output pulse was generated.

Only one strobe will occur initiating a keyboard data command to the print mechanism for each instance that there is an indication that a key has been depressed. On succeeding pulses from the multiplexer 46 for that key, the keyboard strobe is inhibited by a signal from a memory unit 60 indicating that a keyboard strobe has previously been emitted for that key and the key has not as yet been released. This is accomplished in the following manner.

Upon the initial indication that a key has been depressed, obtained from the output of the one of eight multiplexer 46, a bit is entered in parallel with input logic 59 into each of four memory locations of a 4 by 128 bit shift register 60. Each of the four bit locations correspond in count to that particular key code which initiated the keyboard strobe. The output from the last stage of the memory 60 is utilized to inhibit the keyboard strobe logic 58 until all four stages of the memory 60 have been cleared. Thereafter, a reset timer 63 is utilized to serially clear each of the 4 bits 1 every 4 milliseconds. Therefore, the key which was depressed to initiate the printing of a character must be cleared for at least 16 milliseconds before that character may be printed again. In this manner, the scan time of the multiplexer 46 may be accomplished at a very high rate of speed, in this embodiment approximately 128 microseconds. This design permits N-key roll-over without adverse effect and virtually eliminates the effect of contact bounce on the keyboard output. While one or two of the bits in the memory units 60 may be cleared due to contact bounce, when the key returns closed, all 4 bits are again loaded in full in the memories in parallel.

After the key has been released the memories are serially cleared at a reset time interval of approximately 4 milliseconds or a total time interval of approximately 16 milliseconds. Electronically, this is accomplished as shown in FIG. 2.

As shown in FIG. 2 as oscillator 72 of any suitable design is utilized to establish the two megacycle clock 48. The clock 48 is connected to a character counter 52 which governs the reading of the matrix 12 and is also used to condition input logic 76, 78 to a data flop 80 which will be discussed below. The character counter 52 yields 128 counts in 7 bit binary. The four least significant bits of the character counter obtained from pins nine, eight, and eleven of stage one 53 and pin twelve of stage two 54 are connected along lines 82, 83, 84 and 86 to a one of 16 decoder 44. The decoder 44 decodes the four binary bits to yield 16 output states on pins one through three and five through seventeen of the decoder. Each of the output lines 14, 15, 16, 18, 19, 20, 21, 22, 23, 26, 27, 28, 29 are connected in an appropriate manner to the columns of a keyboard matrix 12. The rows of the matrix are connected along lines 32, 33, 34, 36, 37, 38, 39 to a one of eight multiplexer 46 which is operated by the remaining 3 bits of the character counter 52 obtained from pins nine, eight and eleven of the second stage 54 of the character counter 52 and connected to the multiplexer 46 input pins nine, ten and eleven along lines 91 and 92, 94 and 95, and 96 and 97, respectively. Consequently, as the counter 52 counts from zero to 128 the decoder 44 and multiplexer 46 interrogate the innersection of each row and each column. In the event one of the keys is depressed, an output will appear on output pin 6 of the multiplexer. A diode in series with each key is necessary to eliminate sneak paths when multiple keys are depressed.

The output from the multiplexer 46 from output pin 6 is fed along line 104 to condition a data flop 80 indicating that a data pulse has been read. The data flop 80 is cleared with phase two of the clock pulse through NAND gate 78, output pin 6, and is clocked or set with the opposite phase or phase 1 of the data clock 72 through negative input NAND gate 76, output pin 1. This flop 80 latches the signal from the multiplexer 46 and holds it stable during the time that it is stored in memory 60 and utilized to generate a keyboard strobe on output line 106.

As the leading edge of phase one of the clock sets the data flop 80 it also enables a NAND gate 110 to generate a keyboard strobe. This is accomplished along lines 112 and 114 to input pins 12 and 13 of the NAND gate 110. The output of the data flop 80, which has been initiated by the data pulse, is connected from output pin 5 along lines 116 and 118 to input pin 10 of that NAND gate 110 and the fourth condition is fed from the fourth stage of a multistage shift register 60, output pin 7, along line 120 to input pin 9 of the NAND gate 110 to either fully enable that gate 110 or inhibit it in the event data is currently stored for that bit location in memory 60. Assuming that this is the first indication of data from the selected key, line 120 will enable the NAND gate 110.

The output from NAND gate 110 is inverted with an inverter 124 and fed along lines 128 and 106 to yield a keyboard strobe. It is also fed along line 132 to NOR gate 134 and inverted with inverter 136 and connected with line 138 to clock registers 140–146 which are connected to the character counter 52 along lines 150–156 so that the character which corresponds to the code currently in the character counter 52 may be fed along output lines 160–166 to a character buffer (not shown) to be printed by the print mechanism (not shown).

The output of the data flop 80 is also fed along lines 116, 168, 169 and 170 to input pin 2 of the 4 by 128 bit shift register 60.

After the date flop 80 has been set information bits are set in four parallel locations in the four by 128 bit shift register 60. In essence, the shift register 60 serves as four 128 bit memories into each of which a bit is inserted at the time it is detected with the data flop 80. Thereafter each of the bits are removed sequentially after an interval of time determined by the reset timer 65. The bits are entered into each of stage A, B, C and D as follows.

High inputs will store bits in the second and fourth stages, B and D. The high output of pin 5 of the data flop 80 is fed along lines 116, 168 and 170 to input pin 2 of the memory 60 which is stage A or the first 128 bits of the four by 128 bit register. It is also fed along line 175 to input pin 9 of NOR gate 177, the low output of which, from pin 10, is connected to the input of the B stage of memory 60, input pin 13, along line 179. The low output from pin 6 of the data flop 80 is fed along line 181 to input pin 1 of a negative input NOR gate 183, the high output of which, from pin 3, is connected with line 184 to input pin 5 for the C stage of the memory 60. Finally, the output from the data flop 80, pin 5, is fed with lines 116, 168, 175 and 186 to input pin 11 of a NOR gate 188, the output of which from pin 13 is connected to the input of the D stage of the memory, input pin 11, along line 190. These signals are loaded into the appropriate memory 60 locations by the signal from the data flop 80 which is fed along lines 116, 168, 169 and 192 to input 2 of a negative input NOR gate 194, the output of which from pin 1 is connected to the load pin, pin 1 of the shift register 60.

Consequently, each of the four positions are loaded in parallel. Thereafter every 128 microseconds as the character counter 52 counts through the sequence of matrix 12 connections, each time the output of the one of eight multiplexer 46 indicates that that key remains depressed all four memories will be loaded with a bit indicating that the key is depressed. As long as a bit remains in the fourth memory or D stage of the shift register 60 the output of the D stage on line 120 from output pin 7 will remain low to inhibit NAND gate 110 which will prevent a keyboard strobe and thus prevent multiple characters from being stored in the buffer (not shown).

After the key has been released, the next time the one of eight multiplexer 46 checks the key location no pulse will be emitted from output pin 6. Consequently, the data flop 80 will not be set. This will not clear the register 60, however, as no load condition will exist on input pin 1 of the shift register 60. A load condition will occur only upon a load pulse from the reset timer 65.

The reset timer 65 comprises a timer flop 201, a four bit counter 203 and the two NAND gates 205, 206 shown in FIG. 2 which generate a load pulse every 32 counts of the timer counter 203 or every 32 cycles of the character counter 52. The reset timer counter 203 is synchronized with the character counter 52 from the least significant digit from output pin 11 of the second stage 54 of the character counter 52 which is connected along line 211 to the clock input of the timer flop 201, pin 11. This is connected along lines 213, and 214 to the input of stage A of the reset timer counter 203.

The two NAND gates 205, 206 constitute a decoder which yields a load pulse once every thirty two counts of the reset timer counter 203. Since the reset timer counter 203 is counting cycles of the character counter 52 which is being clocked at a one megacycle rate, the character counter 52 cycles every 128 microseconds. Thus, a load pulse is emitted every 32 cycles which yields a reset time of approximately 4 milliseconds.

In essence the reset timer 65 loads the four stage memory 60 every 32 cycles of the character counter 52. If a key is depressed the data flop 80 will be set during that code count and all four bits, one in each stage in the location of the depressed key, will be entered in parallel. If the data flop 80 is not set each stage will be serially cleared until all four stages have been cleared.

After release of the key the first stage will be cleared within the range of 0 to 4 milliseconds as the first timing interval will depend on the starting count in the reset timer counter 203. However, the remaining stages will be cleared after full four millisecond timing cycles, thus providing an overall effective timing interval of between 12 to 16 milliseconds. This is sufficiently long to eliminate the effect of contact bounce but well within the average physical reaction time of a keyboard operator which is approximately 100 milliseconds.

Thus, every 32 cycles of the character counter 52 or every 4 milliseconds the reset timer 65 will emit an output pulse from output pin 4 of the NAND gate 206 which is connected along line 220 to input pin 3 of the negative input NOR gate 194, the output of which on pin 1 creates a load pulse. Since the key has been released and there is no data bit emitted from the one of eight multiplexer 46 the data flop 80 will not be set and thus the A stage will be loaded with a zero or cleared. However, The B, C and D stages will not be cleared as each is conditioned by the NOR gates 173, 183, 188 on the status of the next preceding stage. Consequently, since the A stage is not cleared until after the load pulse, the high output on A will reload through NOR gate 177 a bit in stage B. The bit in stage B will reload through NOR gate 183 stage C, and the bit in stage C will reload through NOR gate 188 stage D. The multiplexer 46 will then operate through 32 additional cycles, as counted by the reset timer counter 203, until another load pulse is emitted by the reset timer 65. Since A was previously cleared there will be no input to stage B through NOR gate 177 and thus stage B will be cleared. However, again stage C and D will remain loaded until two additional timing cycles have cleared all four memories 60.

If one of the switch contacts bounce, that switch would appear open the next time the scanner reads that position. If there were no delay on the memory 60, the memory 60 would clear, and the next time the scanner 46 read that position it would reset the data flop 80 to yield a second keyboard strobe and thus cause multiple outputs.

However, with the multiple stage memory 60, the memory 60 will indicate that it was closed within at least 12 milliseconds so it will have to be open for between 12 to 16 milliseconds to clear all stages of the memory 60 in order to remove the inhibit on line 120 to indicate a new output. Since a contact is likely to bounce for just a few microseconds the next time the multiplexer 46 passes that key location an output pulse will be emitted on pin 6 indicating the contact has again come to rest. This will set the data flop 80 and all four locations will be refilled with bits as previously described.

In this manner the effect of contact bounce is virtually eliminated and the multiplexer 46 scan time can be set at a very high rate, such as 128 microseconds in the instant embodiment, to prevent any transposition effect from N-key roll-over. When all four memory 60 locations have been cleared, the output of stage D will indicate that the memory 60 has been fully cleared. The inhibit will thus be removed from line 120 and NAND gate 110 may again be enabled by the setting of the data flop 80 to emit a keyboard strobe.

The above described design utilizing a reset timer 65 and four parallel memories 60 effectively provides an independent time delay on each key to eliminate contact bounce and to permit the operator to press as many keys in succession as desired without releasing previously depressed keys with no adverse effect. The design shown in the figures of the drawing utilizes standard stock shelf items manufactured by National Semiconductor, Signetics, and other manufacturers as follows:

| Item | Description |
|---|---|
| NAND/NOR GATES | |
| 54/7400 | Quadruple 2-input Positive NAND Gates |
| 54/7402 | Quadruple 2-input Positive NOR Gates |
| 54/7410 | Triple 3-Input Positive NAND Gates |
| 54/7420 | Dual 4-Input Positive NAND Gates |
| 54/7430 | 8-Input Positive NAND Gates |

| Item | Description |
|---|---|
| FLIP-FLOPS 80, 201 | |
| 54/7474 | Dual D-Type Edge-Triggered Flip-Flops |
| ASYNCHRONOUS COUNTERS 53, 54, 203 | |
| 54/7493 | 4-Bit Binary Counters |
| DECODER 44 | |
| 54/74154 | 4-Line-to-16-Line (1 of 16) Decoder/Demultiplexer |

-continued

| | |
|---|---|
| MULTIPLEXER 46 | |
| 54/74151 | 8-Bit Data Selector/Multiplexer with Strobe |
| STORAGE MEANS 60 | |
| National Semiconductor | Quad 128-Bit Static Shift Register |
| MM5055 | |

It should be obvious that various modifications may be made within the scope of invention and still be within the intendment of its teaching. For example, the reset timer 65 may be of any design, including an analog timer, and as many timing cycles may be provided as desired, as well as additional memory units 60, to provide higher resolution.

I claim as my invention:

1. A keyboard circuit comprising:

a plurality of conducting means;

a plurality of continuity switches having contacts for selectively interconnecting two of the conducting means;

counting means for establishing a keyboard code;

sensing means connected to the conducting means and connected to and controlled by the counting means for sequentially interrogating in accordance with the keyboard code the conducting means to determine whether two of the conducting means have been interconnected or disconnected by an operator of the continuity switches and for providing an output signal when two of the conducting means have been interconnected by one of the continuity switches;

means responsive to the output signal for generating a keyboard strobe signal;

storage means operatively connected to the counting means and connected to the sensing means, the storage means comprising at least two memory locations for each keyboard code, for recording the interconnection of two of the conducting means by the selected continuity switch wherein the output signal is electronically recorded in parallel in each memory location corresponding to the selected continuity switch said storage means also being connected to the means for generating a keyboard strobe signal for inhibiting the means for generating a keyboard strobe signal until all memory locations for the selected keyboard code have been cleared; and time delay means connected to the storage means for sequentially clearing each memory location for the selected keyboard code, each memory location being serially cleared after time intervals determined by the time delay means after the selected continuity switch has been disconnected by the operator of the continuity switches.

2. The keyboard circuit of claim 1 wherein the storage means comprises a multiple stage shift register, each stage of the multiple stage shift register having a memory location for each keyboard code.

3. The keyboard circuit of claim 2 wherein a data flip flop is connected to the multiple stage shift register and to the means for generating the selected keyboard strobe signal which, when it is set, enters into each memory location in parallel a data bit corresponding to the keyboard code for the selected keyboard strobe signal and wherein the time delay means comprises a reset timer which is utilized to successively clear the appropriate bit location in each memory location.

4. The keyboard circuit of claim 3 wherein the reset timer is synchronized with the counting means and wherein the reset timer operates to clear information bits from each memory location upon specified cycles of the counting means.

5. The keyboard circuit of claim 3 wherein the reset timer is operatively connected to the multiple stage shift register and serially clears the bits from each memory location within a timing interval which is greater than the time necessary to eliminate contact bounce, but less than the physical reaction time of the operator of the keyboard.

6. The keyboard circuit of claim 1 wherein the plurality of conducting means comprises a matrix having a plurality of first and second conducting elements and wherein the sensing means comprise decoding means connected to the first conducting elements and connected to and controlled by the counting means for sequentially establishing a signal on each of the first conducting elements in accordance with the count in the counting means; and multiplexing means connected to the second conducting elements and connected to and controlled by the counting means for sequentially determining in accordance with the count in the counting means whether a signal has been established on any of the second conducting elements from one of the first conducting elements through one of the continuity switches.

7. The keyboard circuit of claim 1 further comprising register means for monitoring the counting means to determine in accordance with the keyboard code the selected continuity switch.

8. The keyboard circuit of claim 1 further comprising clocking means to synchronize the counting means and the storage means and to establish the rate at which the sensing means will sequentially interrogate the conducting means.

* * * * *